US012717553B2

(12) United States Patent
Hassane et al.

(10) Patent No.: US 12,717,553 B2
(45) Date of Patent: Aug. 25, 2026

(54) FLEXIBLE HIERARCHICAL RULE EVALUATION SYSTEM

(71) Applicant: Insight Direct USA, Inc., Chandler, AZ (US)

(72) Inventors: Anes Hassane, Brooklyn, NY (US); Stelios Avramidis, Boston, MA (US); Thomas Richard Pankake, Prospect, CT (US); Sara Smiles, Brookhaven, GA (US)

(73) Assignee: Insight Direct USA, Inc., Chandler, AZ (US)

( * ) Notice: Subject to any disclaimer, the term of this patent is extended or adjusted under 35 U.S.C. 154(b) by 175 days.

(21) Appl. No.: 18/373,425

(22) Filed: Sep. 27, 2023

(65) Prior Publication Data

US 2024/0118873 A1 Apr. 11, 2024

Related U.S. Application Data

(60) Provisional application No. 63/413,656, filed on Oct. 6, 2022.

(51) Int. Cl.
*G06F 8/30* (2018.01)

(52) U.S. Cl.
CPC .................................... *G06F 8/311* (2013.01)

(58) Field of Classification Search
CPC ....................................................... G06F 8/311
See application file for complete search history.

(56) References Cited

U.S. PATENT DOCUMENTS

| | | | | |
|---|---|---|---|---|
| 5,510,975 | A * | 4/1996 | Ziegler, Jr. | G05B 13/028 706/903 |
| 5,740,321 | A * | 4/1998 | Huffmann | G10H 1/0066 706/61 |
| 7,065,745 | B2 * | 6/2006 | Chan | G06F 8/30 706/46 |
| 9,063,873 | B2 * | 6/2015 | Frei | H04L 51/58 |
| 9,560,070 | B1 | 1/2017 | Aval et al. | |
| 9,846,752 | B2 | 12/2017 | Nasle | |
| 10,297,128 | B2 | 5/2019 | Rasband | |
| 10,474,684 | B2 | 11/2019 | Huang et al. | |
| 10,621,506 | B2 | 4/2020 | Sarkar et al. | |
| 11,037,420 | B2 | 6/2021 | Trani et al. | |
| 11,089,107 | B1 | 8/2021 | Chor et al. | |
| 11,132,510 | B2 | 9/2021 | Ploennigs et al. | |

(Continued)

FOREIGN PATENT DOCUMENTS

| | | | | |
|---|---|---|---|---|
| CN | 111523218 | A | 8/2020 | |
| DE | 102004020994 | A1 * | 11/2005 | G06F 30/30 |
| WO | 2015130639 | A1 | 9/2015 | |

*Primary Examiner* — Phillip H Nguyen
(74) *Attorney, Agent, or Firm* — Kinney & Lange, P.A.

(57) ABSTRACT

A method of performing rule evaluations, with the performance of the rule evaluations by at least one computer processor and storage of the rule evaluations by digital storage media, includes receiving a first input from a first sensor of a plurality of sensors; determining, by the at least one computer processor, which hierarchical nodes from a plurality of hierarchical nodes include a first rule that is dependent upon the first input; retrieving, from the digital storage media, the hierarchical nodes that include the first rule that is dependent upon the first input; and performing an evaluation of the first rule to determine a first output.

18 Claims, 2 Drawing Sheets

(56) References Cited

U.S. PATENT DOCUMENTS

| | | | | |
|---|---|---|---|---|
| 11,164,264 | B2 | 11/2021 | Shalev-Shwartz et al. | |
| 11,250,240 | B1 | 2/2022 | Sheu et al. | |
| 11,294,786 | B2 | 4/2022 | Degaonkar et al. | |
| 2014/0122396 | A1* | 5/2014 | Swaminathan | G06N 5/02 706/14 |
| 2021/0342785 | A1* | 11/2021 | Mann | G06F 3/0484 |

* cited by examiner

FLEXIBLE HIERARCHICAL RULE EVALUATION SYSTEM

CROSS-REFERENCE TO RELATED APPLICATION

The present application claims priority to U.S. Provisional Patent Application No. 63/413,656 by Anes Hassane, filed Oct. 6, 2022, and entitled "FLEXIBLE HIERARCHICAL RULE EVALUATION SYSTEM."

BACKGROUND

This disclosure relates generally to the organization of computer programming rules and, more specifically, to a flexible hierarchical rule evaluation system for receiving inputs and evaluating rules that are dependent upon the inputs in real time.

A computer programming/software system and structure for organizing and evaluating rules can be complex and expansive, with some examples including over five-thousand rules. The rules can depend on various inputs, and the rules are evaluated/run to arrive at outputs, respectively. It can be resource- and time-intensive to evaluate every rule in a system. Thus, current systems evaluate all of the rules dependent upon a schedule (e.g., all rules are evaluated every 20 minutes), even when no or only a few inputs have changed from previous evaluations or when inputs have changed/updated multiple times between scheduled evaluations. Another configuration of current systems can evaluate all of the rules every time one input is received/has changed, regardless of whether the rule is dependent/based upon the input.

SUMMARY

A flexible, hierarchical rule evaluation system and/or structure is disclosed herein that organizes the rules into hierarchical nodes such that the rules are dependent upon inputs from one device or a group of related devices. Thus, each hierarchical node is associated with a specific device or group of related devices, so when one input from the device is initially received or has changed/updated from a previous iteration of that input, the system retrieves only the hierarchical nodes that include the rules dependent upon that input and only evaluates those rules to arrive at outputs, respectively. Because the evaluation is not of every rule in the entire system, the evaluations of specific rules can be performed in real time as inputs are received, thus reducing the amount of time and computing resources needed to evaluate the rules to update the outputs of those rules based on the new inputs.

A method of performing rule evaluations, with the performance of the rule evaluations being by at least one computer processor and storage of the rule evaluations being by machine-readable/digital storage media, is disclosed herein that includes receiving a first input from a first sensor of a plurality of sensors; determining, by the at least one computer processor, which hierarchical nodes from a plurality of hierarchical nodes include a first rule that is dependent upon the first input; retrieving, from the digital storage media, the hierarchical nodes that include the first rule that is dependent upon the first input; and performing an evaluation of the first rule to determine a first output.

A system for evaluating rules in a digital hierarchical structure is disclosed herein that includes a first sensor configured to collect a first input and at least one computer processor in communication with the sensor with the computer processor configured to receive the first input. The digital hierarchical structure includes a first hierarchical node of a plurality of hierarchical nodes with the first hierarchical node including a first rule dependent upon the first input. The at least one computer processor determines that the first hierarchical node includes the first rule dependent upon the first input, retrieves the first rule from the digital hierarchical structure, and evaluates the first rule dependent upon the first input to determine a first output in response to receiving the first input.

Figure 1A:
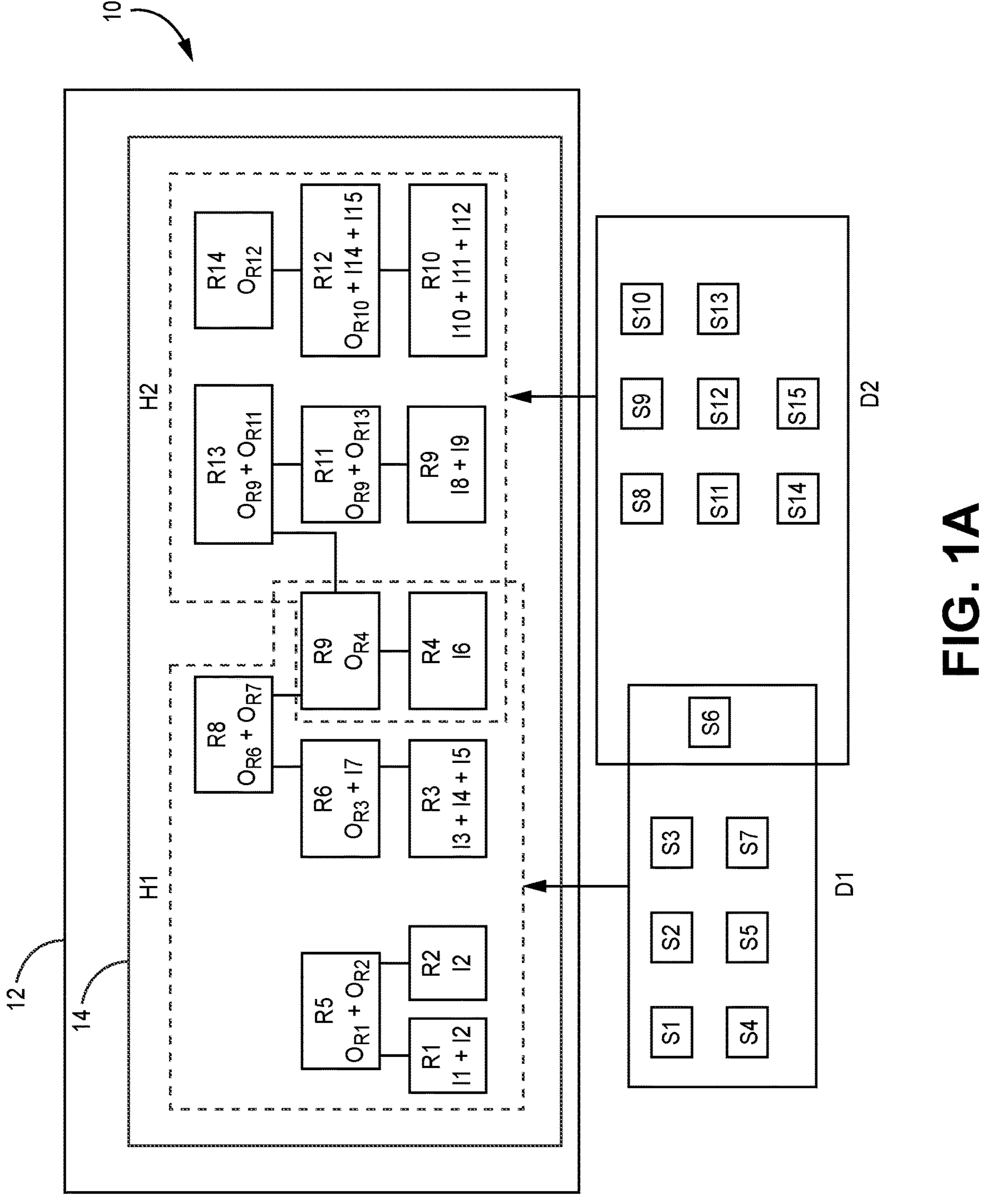
FIG. 1A is an exemplary schematic of a hierarchical rule evaluation structure having two hierarchical nodes associated with two devices.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Figure 1B:
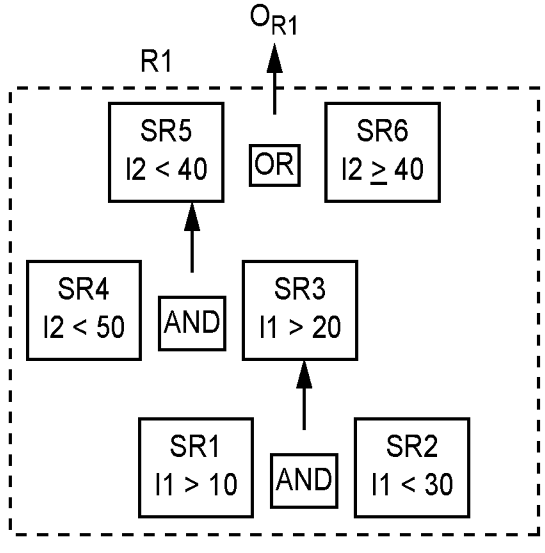
FIG. 1B is an exemplary schematic of a rule having multiple inputs with nested subrules.
Figure 1C:
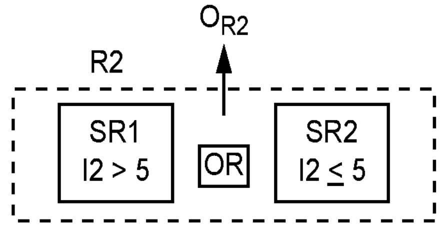
FIG. 1C is an exemplary schematic of a rule having a single input without nested subrules.

FIG. 1A is an exemplary schematic of hierarchical rule evaluation structure/system 10 including computer processor 12, digital/machine-readable storage media 14, first hierarchical node H1 associated with first device D1, and second hierarchical node H2 associated with second device D2, respectively. FIG. 1B is an exemplary example of rule R1 having multiple inputs I1 and I2 with nested subrules SR1-SR6, while FIG. 1C is an exemplary example of rule R2 having a single input I2 without nested subrules SR1 and SR2.

First hierarchical node H1 includes rules R1, R2, R3, R4, R5, R6, R7, and R8 and is associated with first device D1. First device D1 includes sensors S1, S2, S3, S4, S5, S6, and S7 that can provide inputs I1, I2, I3, I4, I5, I6, and I7, respectively, to first hierarchical node H1. Dependent upon inputs I1 and I2, rule R1 derives output $O_{R1}$. Dependent upon input I2, rule R2 derives output $O_{R2}$. Dependent upon inputs I3, I4, and I5, rule R3 derives output $O_{R3}$. Dependent upon input I6, rule R4 derives output $O_{R4}$. Dependent upon output $O_{R1}$ from rule R1 and output $O_{R2}$ from rule R2, rule R5 derives output $O_{R4}$. Dependent upon output $O_{R3}$ from rule R3 and input 17, rule R6 derives output $O_{R6}$. Dependent upon output $O_{R4}$ from rule R4, rule R7 derives output $O_{R7}$. Rule R8 is dependent upon output $O_{R6}$ from rule R6 and output $O_{R7}$ from rule R8.

Second hierarchical node H2 includes rules R4, R7, R9, R10, R11, R12, R13, and R14 and is associated with second device D2. Second device D2 includes sensors S6, S8, S9, S10, S11, S12, S13, S14, and S15 that can provide inputs I6, I8, I9, I10, I11, I12, I13, I14, and I15, respectively, to second hierarchical node H2. Dependent upon inputs 18 and 19, rule R9 derives output $O_{R9}$. Dependent upon inputs I10, I11, and I13, rule R10 derives output $O_{R10}$ Dependent upon output $O_{R9}$ and input I13, rule R11 derives output $O_{R11}$. Dependent upon output $O_{R10}$ from rule R10 and inputs I14 and I15, rule R12 derives output $O_{R12}$. Rule13 is dependent upon output $O_{R9}$ from rule R9 and output $O_{R11}$ from rule R11. Rule R14 is dependent upon output $O_{R12}$ from rule R12.

The disclosed hierarchical nodes and rule structures may not be physical constructs, and instead can be a digital hierarchical structure located in/on machine-readable/digital storage media 14 and/or any other components of computer hardware and/or software. For example, the disclosed structures can be located within software and accessible by computer processor 12. The disclosed structures can include instructions that are executable by computer processor 12 to allow for access to the hierarchical nodes and/or rules and provide a roadmap to computer processor 12 on the configuration/organization of the hierarchical nodes and/or rules.

Structure/system 10 can include or function in association with machine-readable storage media 14 (also referred to herein as digital storage media 14). In some examples, a machine-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media 14 can be entirely or in part a temporary memory, meaning that a primary purpose storage media 14 is not long-term storage. Storage media 14, in some examples, is described as volatile memory, meaning that the memory, does not maintain stored contents when power to structure/system 10 (or the component(s) where storage media 14 are located) is turned off. Examples of volatile memories can include random access memories (RAM), dynamic random-access memories (DRAM), static random-access memories (SRAM), and other forms of volatile memories. In some examples, storage media 14 can also include one or more machine-readable storage media 14. Storage media 14 can be configured to store larger amounts of information than volatile memory. Storage media 14 can further be configured for long-term storage of information. In some examples, storage media 14 include non-volatile storage elements. Examples of such non-volatile storage elements can include magnetic hard discs, optical discs, flash memories and other forms of solid-state memory, or forms of electrically programmable memories (EPROM) or electrically erasable and programmable (EEPROM) memories. Most generally, storage media 14 is machine-readable data storage capable of housing stored data from a stored data archive.

Structure/system 10 can also include or function in association with one or multiple computer/data processors 12. In general, computer/data processors 12 can include any or more than one of a processor, a microprocessor, a controller, a digital signal processor (DSP), an application specific integrated circuit (ASIC), a field-programmable gate array (FPGA), or other equivalent discrete or integrated logic circuitry.

Structure/system 10 can include other components not expressly disclosed herein that are suitable for performing the functions of structure/system 10 and associated methods. For example, structure/system 10 can include communication means for communication with devices D1 and D2 and/or individually with sensors S1-S15.

First hierarchical node H1 is a collection of rules R1-R8 that are each dependent upon at least one input I1-I7 collected by sensors S1-S7, which are associated with first device D1. Thus, when any of inputs I1-I7 as collected by sensors S1-S7 from first device D1 change (i.e., are updated), only rules R1-R8 need to be evaluated/run (only those rules that are dependent upon inputs that have changed) and not all of the rules in structure/system 10.

Each rule R1-R8 of first hierarchical node H1 (and each rule, generally) can be a formula or any type of instructions for evaluating and/or conveying data. As shown in FIG. 1B, exemplary rule R1 has multiple inputs with nested subrules. Exemplary rule 1 includes three levels of evaluation dependent upon inputs I1 and I2 from sensors S1 and S2 of first device D1. In this example, input I1 can be data collected by temperature sensor S1 in the unit of Celsius and S2 can be data collected by pressure sensor S2 in the unit of Kilopascals. For example, first device D1 can be a commercial freezer, and sensors S1 and S2 can be located within the cold cavity of the freezer. In exemplary rule R1, subrule SR1 evaluates whether input I1 from sensor S1 is greater than 10, while subrule SR2 evaluates whether input I1 is less than 30. If so, rule R1 proceeds to subrule SR3, which evaluates whether input I1 is greater than 20 and subrule SR4 evaluates whether input I2 is less than 50. If so, rule R1 proceeds to subrule SR5, which evaluates whether input I2 is less than 40: if so, output $O_{R1}$ is determined from subrule SR5 and if not, output $O_{R1}$ is determine from subrule SR6 (because if input I2 is not less than 40, input I2 is greater than 40). Thus, the determination of output $O_{R1}$ of rule R1 requires three levels of determinations. The determination of output $O_{R1}$ by rule R1 can be a formula or other organizational structure/configuration, can have any number of determinations/calculations, any number of levels, and any number of inputs.

The exemplary rule R2 as shown in FIG. 1C has a single input I2 determining a single output $O_{R2}$ In rule R2, subrule SR1 evaluates if input I2 is greater than 5 and subrule SR2 evaluates if input I2 is less than or equal to 5. Depending on the value of input I2, either subrule SR1 or subrule SR2 determines output $O_{R2}$ of rule R2.

Inputs I1-I7 can be collected once, periodically, or continuously by sensors S1-S7, respectively, and those inputs I1-I7 can be relayed to structure/system 10 to be used in rules R1-R8. The evaluation of rules R1-R8 upon receiving updated/changed inputs I1-I7 can be in real time, and the evaluation can be performed each time updated/changed inputs I1-I7 are received. Thus, the rules can be evaluated often. In exemplary first hierarchical node H1, rules R1-R4 only depend upon inputs I1-I6 from sensors S1-S6 and do not require outputs determined by other rules, so rules R1-R4 are evaluated first when updated/changed inputs I1-I6 are received. Then, because they depend upon outputs $O_{R1}$-$O_{R4}$ from rules R1-R4, rules R5-R7 are then evaluated. Finally, rule R8 is evaluated as it depends upon outputs $O_{R6}$ and $O_{R7}$. These evaluations can be performed by one or multiple computer processors 12 and can be performed almost instantaneously. While shown has having eight rules arranged in three levels, first hierarchical node H1 can have any number of rules having any arrangement. For example, first hierarchical node H1 can have thousands of rules arranged into hundreds or thousands of levels with the rules being interconnected/dependent upon any number of other rules, though all of the rules of first hierarchical node H1 should be associated with one device D1 (which itself can have hundreds or thousands of sensors/data collection components).

First device D1 can be one physical device, such as a commercial freezer, or can be a combination of multiple sub-devices. For example, a device D1 or D2 can be a building with the sub-devices being the components/systems within the building, such as the electrical system, the HVAC system, the security system, etc., that each can include a large number of sensors collected and relaying to hierarchical nodes H1 and/or H2 a large number of inputs. Thus, as detailed above, hierarchical nodes H1 and/or H2 can include thousands of rules dependent upon the many inputs from the many sensors associated with the building.

Similarly, second hierarchical node H2 is a collection of rules R4, R7, and R8-I4 that are each dependent upon at least one of input I6 and I8-I15 collected by sensors S6 and S8-S15, which are associated with second device D2. Thus, when inputs 16 and I8-I15 as collected by sensors S6 and S8-S15 from second device D2 change (i.e., are updated), only rules R4, R7, and R9-R14 need to be evaluated/run (only those rules that are dependent upon inputs that have changed) and not all of the rules in structure/system 10. Each rule R4, R7, and R9-R14 of second hierarchical node H2 can be a formula or any type of instructions for evaluating and/or conveying data.

As shown in FIG. 1A, first hierarchical node H1 and second hierarchical node H2 can share rules R4 and R9 such that both nodes H1 and H2 include these rules. Such a configuration can exist when a sensor (in this example sensor S6) is associated with more than one device (in this example both devices D1 and D2) and/or when one rule depends upon inputs from sensors associated with two devices (e.g., rule R4 would depend from input I5 from sensor S5 and input 18 from sensor S8 instead of just from input I6 from sensor SA). For example, first device D1 can be a freezer and second device D2 can be a refrigerator in a freezer-refrigerator combination appliance with sensor S6 measuring the electrical energy (e.g., voltage) being provided to the freezer-refrigerator combination. Thus, sensor S6 would be both a part of/associated with first device D1 and second device D2.

Inputs I1-I15 are collected/measured by sensors S1-S15, respectively. Sensors S1-S15 can be any type of measurement devices and/or devices capable of relaying information to rules R1-R14. Thus, while labeled herein as "sensors," components S1-S15 do not necessarily need to be sensors and can instead be any type of components for storing and/or relaying information about devices D1 and/or D2, respectively. For example, one of sensors S1-S15 can be a look-up table, user-configured data, device model numbers, and/or other information about device D1 and/or D2. Therefore, inputs I1-I15 can be any type of information/data configured in any format for use in rules R1-R14.

Hierarchical rule evaluation structure/system 10 performs evaluations of rules R1-R14 using at least one computer processor 12 and stores hierarchical nodes H1 and H2, rules R1-R14, and any other associated information/data/software using machine-readable/digital storage media 14. Structure/system 10 performs the rule evaluations by receiving at least one input I1-I15 from at least one sensor S1-S15 of the plurality of sensors of first device D1 and/or second device D2, then determining which hierarchical nodes H1 and/or H2 include one or multiple rules R1-R14 that depend from the inputs I1-I15 that were received. Structure/system 10 then retrieves the hierarchical nodes H1 and/or H2 that include any rules R1-R14 that depend upon the received inputs I1-I15 and perform the evaluation/run those rules to determine outputs of those rule evaluations. This process can be repeated for more than two hierarchical nodes, and repeats any time inputs I1-I15 are updated (or new inputs are received) to update the outputs $O_{R1}$-$O_{R12}$ from rules R1-R14 depending on inputs I1-I15.

For example, sensor S2 can collect data and relay that data to structure/system 10 as input I2. Structure/system 10 receives input I2, determines which hierarchical nodes H1 and/or H2 include rules that are dependent upon that input I2 (in this example, that would be rules R2 and R5), retrieve first hierarchical node H1 from digital storage media 14, and perform an evaluation of rules R2 and R5 using inputs I2 (such an evaluation would also use input I1, which would be data previously received by sensor S1) to determine output $O_{R2}$ and any outputs from rule R5. If updated data from sensor S2 is relayed to structure/system 10 as updated input I2, then the process is performed again.

As detailed above, more than one hierarchical node H1 and H2 can each include a rule R4 and/or R7 that is associated with more than one device D1 and D2. Thus, if input I6 is received, structure/system 10 would retrieve both first hierarchical node H1 and second hierarchical node H2. Each rule of rules R1-R14 can be evaluated in real time as new/updated inputs I1-I15 are received from sensors S1-S15.

The following are nonlimiting examples of structure/system 10 and related processes of performing evaluations of rules R1-R14:

A process of performing rule evaluations, with the performance of the rule evaluations being by at least one computer processor and storage of the rule evaluations being by digital storage media, The process disclosed herein includes receiving a first input from a first sensor of a plurality of sensors; determining, by the at least one computer processor, which hierarchical nodes from a plurality of hierarchical nodes include a first rule that is dependent upon the first input; retrieving, from the digital storage media, the hierarchical nodes that include the first rule that is dependent upon the first input; and performing an evaluation of the first rule to determine a first output.

The process can further have the hierarchical nodes include a first hierarchical node that has the first rule and a second hierarchical node that has a second rule with the process determining that the first rule is dependent upon the first input, determining that the second rule is dependent upon the first input, retrieving the first hierarchical node and the second hierarchical node from the digital storage media, and performing the evaluation of the first rule to determine a first output and the second rule to determine a second output.

The process can further have the first hierarchical node include a third rule and and the process includes determining that the third rule is dependent upon the first output and performing the evaluation of the third rule to determine a third output.

The process can further have the first hierarchical node include a fourth rule and the process includes determining that the fourth rule is dependent upon the third output and performing the evaluation of the fourth rule to determine a fourth output.

The process can further have the hierarchical nodes include a third hierarchical node that has the first rule and the process can include retrieving the third hierarchical node from the digital storage media and performing the evaluation of the first rule to determine the first output.

The process can further have the first hierarchical node with a first set of rules that includes the first rule and the second hierarchical node with a second set of rules that includes the second rule.

The process can further have the first set of rules being associated with a first set of sensors of the plurality of sensors that include the first sensor and the process can include collecting inputs by the first set of sensors from a first device.

The process can further have the second set of rules being associated with a second set of sensors of the plurality of sensors that include the second sensor and the process can include collecting inputs by the second set of sensors from a second device.

The process can further have that the first device is independent from the second device.

The process can further have the first set of sensors of the plurality of sensors being each associated with a first device, and the first sensor is within the first set of sensors.

The process can further have the hierarchical nodes include a first hierarchical node having multiple rules with each of the multiple rules being dependent upon at least one input from the first set of sensors associated with the first device.

A system for evaluating rules in a digital hierarchical structure is disclosed herein that includes a first sensor configured to collect a first input and at least one computer processor in communication with the sensor with the computer processor configured to receive the first input. The digital hierarchical structure includes a first hierarchical node of a plurality of hierarchical nodes with the first hierarchical node including a first rule dependent upon the first input. The at least one computer processor determines that the first hierarchical node includes the first rule dependent upon the first input, retrieves the first rule from the digital hierarchical structure, and evaluates the first rule dependent upon the first input to determine a first output in response to receiving the first input.

The system can further have a first device from which a first set of sensors including the first sensor is configured to collect first data including the first input, wherein the first hierarchical node includes a first plurality of rules including the first rule with each rule of the first plurality of rules being dependent upon the first data collected from the first device.

The system can further have the first set of sensors being configured to continuously collect first data from the first device.

The system can further have the at least one computer processor retrieves only each rule of the first plurality of rules that depend on first data that has changed from a previous collection of first data and immediately evaluates each rule of the first plurality of rules dependent on the first data.

The system can further have a second sensor configured to collect a second input, the at least one computer processor configured to receive the second input, and a second hierarchical node of the plurality of hierarchical nodes within the digital hierarchical structure with the second hierarchical node includes a second rule dependent upon the second input, wherein the at least one computer processor determines that the second hierarchical node includes the second rule dependent upon the second input, retrieves the second rule from the digital hierarchical structure, and evaluates the first rule dependent upon the first input to determine a second output in response to receiving the second input.

The system can further have a second device from which a second set of sensors including the second sensor is configured to collect second data including the second input, wherein the second hierarchical node includes a second plurality of rules including the second rule with each rule of the second plurality of rules being dependent upon the second data collected from the second device.

The system can further have the second set of sensors are configured to continuously collect second data from the second device.

The system can further have the at least one computer processor retrieves only each rule of the second plurality of rules that depend on second data that has changed from a previous collection of first data and immediately evaluates each rule of the second plurality of rules dependent on the second data.

The system can further have digital storage media that contains at least a portion of the computer database hierarchical structure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of performing rule evaluations, the performance of the rule evaluations by at least one computer processor and storage of the rule evaluations by digital storage media, the method comprises:

receiving a first input from a first sensor of a plurality of sensors;

determining, by the at least one computer processor, which hierarchical nodes from a plurality of hierarchical nodes include a first rule and a second rule that are each dependent upon the first input with the hierarchical nodes including a first hierarchical node that includes the first rule, a second hierarchical node that includes the second rule, and a third hierarchical node that includes the first rule but is different from the first hierarchical node;

determining that the first rule is dependent upon the first input;

determining that the second rule is dependent upon the first input;

retrieving, from the digital storage media, the first hierarchical node, the second hierarchical node, and the third hierarchical node that each include the first rule that is dependent upon the first input; and performing, concurrently and in real time, multiple evaluations of the first rule to determine a first output corresponding to the first hierarchical node, a second output corresponding to the second hierarchical node, and a third output corresponding to the third hierarchical node.

2. The method of claim 1, wherein the first hierarchical node includes a third rule, the method further comprising:

determining that the third rule is dependent upon the first output; and performing the evaluation of the third rule to determine a fourth output.

3. The method of claim 1, wherein the first hierarchical node includes a fourth rule, the method further comprising:

determining that the fourth rule is dependent upon the fourth output; and performing the evaluation of the fourth rule to determine a fifth output.

4. The method of claim 1, wherein the first hierarchical node has a first set of rules that includes the first rule and the second hierarchical node has a second set of rules that includes the second rule.

5. The method of claim 4, wherein the first set of rules are associated with a first set of sensors of the plurality of sensors that include the first sensor, the method further comprising:

collecting inputs by the first set of sensors from a first device.

6. The method of claim 5, wherein the second set of rules are associated with a second set of sensors of the plurality of sensors that include the second sensor, the method further comprising:

collecting inputs by the second set of sensors from a second device.

7. The method of claim 6, wherein the first device is independent from the second device.

8. The method of claim 1, wherein a first set of sensors of the plurality of sensors are each associated with a first device, and the first sensor is within the first set of sensors.

9. The method of claim 8, wherein the first hierarchical node having multiple rules, each of the multiple rules being dependent upon at least one input from the first set of sensors associated with the first device.

10. A system for evaluating rules in a digital hierarchical structure, the system comprising:

a first sensor configured to collect a first input;

at least one computer processor in communication with the sensor, the computer processor configured to receive the first input; and the digital hierarchical structure that includes a first hierarchical node, a second hierarchical node, and a third hierarchical node of a plurality of hierarchical nodes, the first hierarchical node includes a first rule dependent upon the first input, the second hierarchical node includes a second rule dependent upon the first input, and the third hierarchical node includes the first rule but is different from the first hierarchical node, wherein the at least one computer processor:

determines that the first hierarchical node includes the first rule dependent upon the first input, that the second hierarchical node includes the second rule, and the third hierarchical node includes the first rule;

retrieves the first hierarchical node, second hierarchical node, and the third hierarchical node from the digital hierarchical structure; and evaluates, concurrently and in real time, the first rule dependent upon the first input to determine a first output corresponding to the first hierarchical node in response to receiving the first input, the second rule dependent upon the first input to determine a second output corresponding to the second hierarchical node, and the first rule dependent upon the first input to determine a third output corresponding to the third hierarchical node.

11. The system of claim 10, further comprising:

a first device from which a first set of sensors including the first sensor is configured to collect first data including the first input, wherein the first hierarchical node includes a first plurality of rules including the first rule with each rule of the first plurality of rules being dependent upon the first data collected from the first device.

12. The system of claim 11, wherein the first set of sensors are configured to continuously collect first data from the first device.

13. The system of claim 12, wherein the at least one computer processor retrieves only each rule of the first plurality of rules that depend on first data that has changed from a previous collection of first data and immediately evaluates each rule of the first plurality of rules dependent on the first data.

14. The system of claim 11, further comprising:

a second sensor configured to collect a second input;

the at least one computer processor configured to receive the second input; and a fourth hierarchical node of the plurality of hierarchical nodes within the digital hierarchical structure, the fourth hierarchical node includes a third rule dependent upon the second input, wherein the at least one computer processor determines that the fourth hierarchical node includes the third rule dependent upon the second input, retrieves the third rule from the digital hierarchical structure, and evaluates the first rule dependent upon the first input to determine a second output in response to receiving the second input.

15. The system of claim 14, further comprising:

a second device from which a second set of sensors including the second sensor is configured to collect second data including the second input, wherein the fourth hierarchical node includes a second plurality of rules including the third rule with each rule of the second plurality of rules being dependent upon the second data collected from the second device.

16. The system of claim 15, wherein the second set of sensors are configured to continuously collect second data from the second device.

17. The system of claim 16, wherein the at least one computer processor retrieves only each rule of the second plurality of rules that depend on second data that has changed from a previous collection of first data and immediately evaluates each rule of the second plurality of rules dependent on the second data.

18. The system of claim 11, further comprising:

digital storage media that contains at least a portion of the computer database hierarchical structure.

* * * * *